United States Patent [19]

Unger

[11] 4,415,227
[45] Nov. 15, 1983

[54] TRANSITION BETWEEN TWO SINGLE MODE OPTICAL WAVEGUIDES

[75] Inventor: Hans-Georg Unger, Braunschweig, Fed. Rep. of Germany

[73] Assignee: Licentia Patent-Verwaltungs-GmbH, Frankfurt am Main, Fed. Rep. of Germany

[21] Appl. No.: 249,890

[22] Filed: Apr. 1, 1981

[30] Foreign Application Priority Data

Apr. 2, 1980 [DE] Fed. Rep. of Germany ....... 3012775

[51] Int. Cl.³ .............................................. G02B 5/172
[52] U.S. Cl. .................................................. 350/96.15
[58] Field of Search ........................... 350/96.15, 96.16

[56] References Cited

U.S. PATENT DOCUMENTS 3,779,628 12/1973 Kapron et al. ................... 350/96.15
4,060,308 11/1977 Barnoski et al. ................. 350/96.15

FOREIGN PATENT DOCUMENTS 2522039 11/1976 Fed. Rep. of Germany ... 350/96.15
53-108443 9/1978 Japan ................................ 350/96.15

OTHER PUBLICATIONS

Wagh, "Coupling Efficiency Between Light Pipes of Different Dimensions," *Applied Optics*, vol. 15, No. 11, Nov. 1976, pp. 2840-2843.

*Primary Examiner*—John D. Lee
*Attorney, Agent, or Firm*—Spencer & Frank

[57] ABSTRACT

A connection piece connected for propagating light between two single mode optical waveguides having respectively different cross sections, the piece being in the form of a transition from one cross section to the other. The waveguides and the piece are composed of a transparent core member forming a light propagating path from one waveguide to the other via the transition, and a cladding material surrounding the core member. The core member part of the piece is formed to vary gradually and continuously in cross section in the direction of light propagation, and the piece has a length which is two to four times the free space wavelength of the light to be propagated divided by the difference between the index of refraction of the core member and the index of refraction of the cladding material.

5 Claims, 2 Drawing Figures

TRANSITION LENGTH

TRANSITION LENGTH

TRANSITION BETWEEN TWO SINGLE MODE OPTICAL WAVEGUIDES

BACKGROUND OF THE INVENTION

The present invention relates to connecting pieces for establishing a light propagating transition between two single mode optical waveguides having respectively different cross sections.

Arrangements for transmitting and processing signals by means of optical waves normally operate best when single mode waveguides are used in the components themselves and as connectors therefor. However, occasionally, or even frequently, this requires the connection of waveguides having respectively different cross-sectional configurations. The fundamental mode, which is the only mode conducted by single mode waveguides, loses power in these transitions due to radiation and the radiated power may interfere if it is collected at another part of the arrangement where it can give rise to crosstalk or other interference phenomena. Both effects—radiation losses and interference radiation—must normally be suppressed as well as possible.

SUMMARY OF THE INVENTION

It is an object of the present invention to make possible transitions which, with a short structural length, permit only very little fundamental mode power to be radiated.

The above and other objects are achieved, according to the invention, by the provision of a connection piece connected for propagating light between two single mode optical waveguides having respectively different cross sections, the piece being in the form of a transition from one cross section to the other, the waveguides and the piece being composed of a transparent core member forming a light propagating path from one waveguide to the other via the transition, and a cladding material, e.g. in the form of a jacket, surrounding the core member, the core member part of the piece being formed to vary gradually and continuously in cross section in the direction of light propagation, and the piece having a length which is two to four times the free space wavelength of the light to be propagated divided by the difference between the index of refraction of the core member and the index of refraction of the cladding material.

DESCRIPTION OF THE PREFERRED EMBODIMENTS

Figure 1:
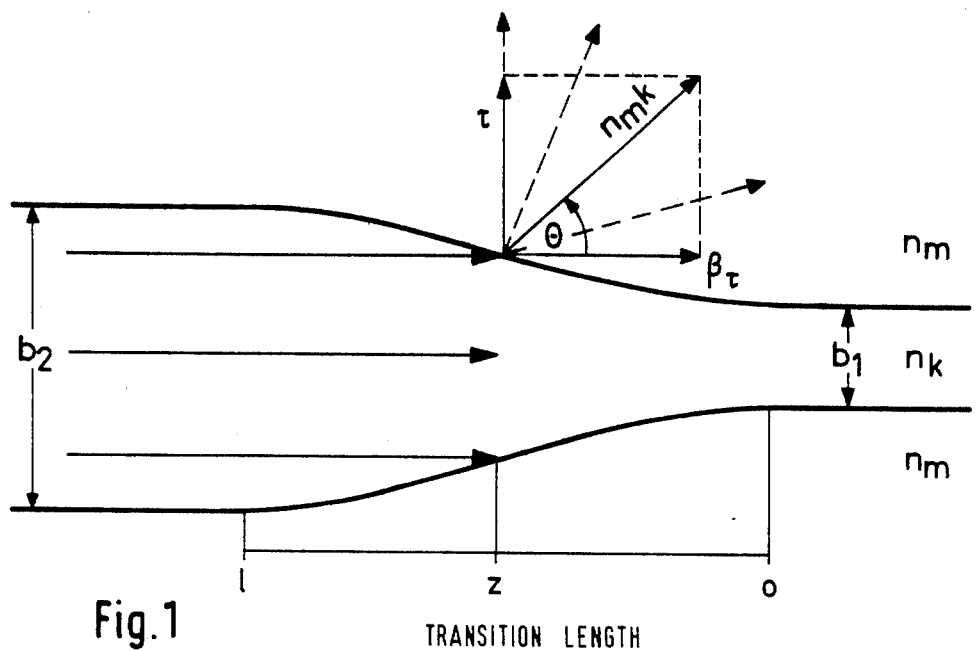
FIGS. 1 and 2 are longitudinal pictorial views of two transition configuration embodiments according to the invention.

FIG. 1 is an example, in the form of a longitudinal sectional view, of a transition according to the invention in which the cross section of the optical waveguide gradually varies, or tapers, over its entire length, from a core with the index of refraction $n_k$ and the cross-sectional dimension, or diameter, $b_2$ to a core with the same index of refraction but a smaller cross-sectional dimension, or diameter, $b_1$. The arrows indicate the fundamental mode light energy which propagates from the direction of the larger cross section. Part of the fundamental mode power is reflected at the core wall in the tapered portion, part thereof is radiated out. However, due to the tapered configuration according to the invention, the reflected power is so small compared to the radiated power that only the latter need be considered in order to arrive at the correct dimensions for the transition.

FIG. 1 indicates that the transition has a total length l, and at any given distance z from the start (z=0) of the transition, more or less power is radiated in all radial directions of the jacket surrounding the core. This jacket has an index of refraction $n_m$. The radiation propagates in the jacket with a wave number $n_m k$, where $k = 2\pi/\lambda$ is the wave number in free space with $\lambda$ being the wavelength of light in free space. For the component radiated at the angle $\theta$ to the waveguide axis, the wave number vector has the transverse component:

$$\tau = n_m k \sin \theta \qquad (1),$$

and the longitudinal component:

$$\beta_\tau = n_m k \cos \theta \qquad (2).$$

This component of the radiation at angle $\theta$ is excited by the fundamental mode wave, which impinges with a power $P_0 = 1$ unit of power, and has the following amplitude:

$$a(\tau) = \int_0^l H(\tau, z) \exp\left[ j \int_0^z (\beta_\tau - \beta) dz' \right] dz \qquad (3)$$

where $H(\tau, z)$ is the excitation or coupling coefficient at the distance z from the start of the transition between the fundamental mode wave and the radiation field component in the direction $\theta = \arcsin(\tau/n_m k)$. $\beta$ is the phase constant of the fundamental wave at distance z along the transition. 'dz' in equation (3) designates the infinitesimally short increment of distance z for the integral along the transition. '$\beta_\tau$' has the same significance in equations (2) and (3). '$a(\tau)$' in equation (3) is the amplitude of the component of the radiation at angle $\theta$ and as such is so defined that $|a(\tau)|^2 d\tau$ represents the power which is altogether radiated into directions between $\theta = \arcsin(\tau/n_m k)$ and $\theta + d\theta = \arcsin((\tau + d\tau)/(n_m k))$.

In order to determine the total radiated power, $P_r$, the square of $a(\tau)$ must be integrated over the total range of $\theta$ which corresponds to the range of values for angle $\theta$ over which power is radiated. Therefore, the following calculation must be made:

$$P_r = \int_0^{n_m k} |a(\tau)|^2 d\tau \qquad (4)$$

It is sufficient here to cover the radiation field only up to the angle value $\theta = \pi/2$, because the power reflected at $\theta > \pi/2$ is just as insignificant as the power reflected in the fundamental mode. For $\theta = \pi/2$, $\tau = n_m k$.

In order to keep $P_r$ as small as possible, the transition must be designed so that $|a(\tau)|$ remains low over the entire integration range from $\tau = 0$ to $\tau = n_m k$. In this connection, we consider that the right side of Equation (3) is similar to a limited Fourier transformation of the function H(z) from the z region in the regions of the variables $\beta_\tau - \beta$. It even corresponds to a limited Fourier transformation if we neglect the change in $\beta$ along the transition. Then Equation (3) is simplified to $$a(\tau) = \int_0^l H(\tau, z) \exp[j(\beta_\tau - \beta)z]dz. \quad (5)$$

A determination must now be made of the manner of selecting the distribution H(z) so that its Fourier transform will have as low a magnitude as possible for all values of $\beta_\tau - \beta$, which occur in the range between $\tau=0$ and $\tau=n_m k$. In fact, $\beta - \beta_\tau$ goes from $\beta - n_m k$ to $\beta$, when $\tau$ goes from 0 to $n_m k$.

Single mode optical waveguides are normally dimensioned in such a manner that, for the selected light wavelength the first natural wave of a higher order is just not propagated by the waveguide. Under these circumstances, the phase constant of the fundamental mode is approximately the arithmetic mean of the core wave number ($n_k k$) and the wave number of the surrounding cladding material. The following thus applies:

$$\beta \approx (n_k + n_m)k/2 \quad (6).$$

In this case $\beta - \beta_\tau$ is, for $\tau = 0$ $$\beta - n_m k = (n_k - n_m)k/2 \quad (7),$$

while for $\tau = n_m k$ it rises to $$\beta = (n_k + n_m)k/2 \quad (7a).$$

Generally, the refractive index of the core of an optical waveguide is only slightly higher than the refractive index of its cladding material, which means that $\beta - \beta_\tau$ rises from a very low value according to Equation (7) at $\tau=0$ to the relatively high value according to Equation (6) or (7a) at $\tau=n_m k$. However, over this entire range, $a(\tau)$ (Equation 5) should furnish as little energy as possible to the radiation field. The lower limit of the region for which $\beta_\tau - \beta$ is very low is here particularly critical. An effective reduction of the total radiation energy is possible only if the exponent in Equation (5) becomes so large during the integration from $z=0$ to $z=l$, and thus shifts the integrand of Equation (5) in phase to such an extent, that the radiation components of one section of the transition destructively interfere with those of another section. Thus, even at $\tau=0$, where $\beta - \beta_\tau$ is only $(n_k - n_m)k/2$, the exponent in Equation (5) must still be large enough at $z=l$ that it results in this destructive interference. From this there results, for certain values of $(n_k - n_m)k/2$ a certain minimum length for the transition.

In order to keep this transition length within certain limits, a favorable distribution along the transition must also be found for the coupling coefficient $k(\tau, z)$ of Equation (5) and then the transition mut be designed in such a manner that this favorable distribution $k(\tau,z)$ will occur. In transitions between single mode optical waveguides, the cross-sectional dimensions always change only within narrow limits; otherwise the larger cross section would no longer be single moded or the smaller cross section would no longer be able to guide the fundamental mode with sufficient confinement. For such transitions with slight changes in the cross-sectional dimensions, the coupling coefficient can be divided into two factors, as follows:

$$H(\tau, z) = K(\tau)\frac{db}{dz}, \quad (8)$$

of which $K(\tau)$ is constant along the transition and only db/dz depends on z, depending on the contours of the transition. If the cross section has not only a dimension b, as for example the core radius of a stepped profile fiber, but has several dimensions, as for example width and height of a planar waveguide with rectangular cross section, then the derivations of these dimensions with respect to z are additively combined in $H(\tau, z)$.

Using Equation (8), Equation (5) becomes $$a(\tau) = K(\tau) \int_0^l \frac{db}{dz} \exp[j(\beta_\tau - \beta)z]dz. \quad (9)$$

Here it is now the object to find, for db/dz, such a distribution along the transition that due to the phase shift the destructive interference has the same good effect for all values from $\tau=0$ to $\tau=n_m k$. In order to compare various transition contours with one another with respect to the excitation of radiation fields, we now consider the integral in Equation (9) which, when the following abbreviation is used:

$$x_\tau = (\beta - \beta_\tau)l/2 \quad (10)$$

has the magnitude $$I(\tau) = \left| \int_0^l \frac{db}{dz} e^{-j2x_\tau z/l} dz \right| \quad (11)$$

A linear transition for an optical waveguide is obvious and is described in the literature. In such a transition, $$db/dz = (b_2 - b_1)l \quad (12),$$

i.e., db/dz is constant along the transition. For this type, the integral in Equation (9) comes to the following amount $$I(\tau) = (b_2 - b_1)\left|\frac{\sin x_\tau}{x_\tau}\right| \quad (13)$$

As a function of $x_\tau$, the $I(\tau)$ of this linear transition is zero at values of $x_\tau$ which are integer number multiples of $\pi$. Between these lie the maxima of $I(\tau)$ whose height decreases with increasing $x_\tau$, but only in inverse proportion to $x_\tau$. This destructive interference is thus fully effective only at $x_\tau = n\pi$ where $n=1, 2, 3$, etc., and it is less effective at $x_\tau = (2n+1)\pi/2$.

Particularly strong contributions to the radiation field come from both ends of the linear transition, at the locations where the transition contour has a bend. Due to the fact that the contour is bent at its end opposite the transition inlet, the contributions made to the radiation field by the bends have opposite signs and thus are superposed at additional phase differences of $x_\tau = (2n+1)\pi/2$ in precisely the correct phase to thus produce a maximum in the radition field.

These maxima can be reduced if bends in the contour are avoided, i.e., care is taken that not only b, but also db/dz change only gradually along the transition. The contour in FIG. 2 at which the cross section widens according to the cosine function $$b(z) = \frac{b_1 + b_2}{2} - \left(\frac{b_2 - b_1}{2}\right) \cos\left(\frac{\pi}{l} z\right) \tag{14}$$

and which has a slope $$\frac{db}{dz} = \frac{\pi}{2}\left(\frac{b_2 - b_1}{l}\right) \sin\left(\frac{\pi}{l} z\right) \tag{15}$$

corresponds to such an approach. For this contour, the integral $I(\tau)$ of Equation (9) is:

$$I(\tau) = (b_2 - b_1) \left|\frac{\cos x_\tau}{1 - 4x_\tau^2/\pi^2}\right| \tag{16}$$

As a function of $x_\tau$, it has a first zero value position at $$x_\tau = 3\pi/2 \tag{17}$$

Further zero value positions occur at larger odd numbered multiples of $\pi/2$. Between these lie maxima of $I(\tau)$, whose heights decrease with increasing $x_\tau$. If $x_\tau$ is sufficiently large, the height of each maximum is inversely proportional to the square of $x_\tau$. In this equation, the behavior of a transition whose contour follows a cosine function without a bend differs clearly from the linear transition. In the linear transition, the contributions to the radiation field by the bends in the contour lead to maxima of $I(\tau)$—with a quasi constructive interference—which are much greater and only inversely proportional to $x_\tau$, even with increasing $x_\tau$.

This much improved reduction of radiation fields by means of destructive interference requires a somewhat greater transmission length, l, than for a linear transition. With a linear transition, the transition length should be only slightly less than $$l = 2\pi/(\beta - n_m k) \tag{18}$$

so that the first zero value position of $I(\tau)$ at $x_\tau = \pi$ lies closely above the lower limit of the integration range of $\tau = 0 \ldots n_m k$ in Equation (4). In contradistinction thereto, in a transition with cosine contour and without a bend, this first zero position lies at $x_\tau = 3\pi/2$ and l should be only a little less than $$l = 3\pi/(\beta - n_m k) \tag{19}$$

so that, starting with $\tau = 0$, the destructive interference in the radiation field is fully effective over the entire integration range of $\tau$.

One could now raise the question whether a further reduction in the radiation field than that obtainable in a transition without bend and with cosine contour would be possible. In fact, there results a characteristic $I(\tau)$ which decreases to an even greater degree with increasing $x_\tau$ than that of Equation (16), if the shape of the contour is selected according to $$\frac{db}{dz} = 2\left(\frac{b_2 - b_1}{l}\right) \sin^2(\pi z/l) \tag{20}$$

so that the second derivative $d^2b/dz^2$ at the beginning and end of the transition disappears as well. For this contour shape, the transition itself has the form $$b(z) = b_1 + (b_2 - b_1)\left[\frac{z}{l} - \frac{1}{2\pi} \sin\left(\frac{2\pi z}{l}\right)\right] \tag{21}$$

and the integral in Equation (9) is $$I(\tau) = \frac{(b_2 - b_1) |\sin x_\tau|}{x_\tau |1 - x_\tau^2/\pi^2|} \tag{22}$$

As a function of $x_\tau$ it has its first zero value position at $$x_\tau = 2\pi \tag{23}$$

followed by further zero value positions at all whole number multiples greater than $2\pi$. The maximum values between these zero value positions finally decrease in inverse proportion to the third power of $x_\tau$.

Approximately to the same degree to which the maxima of $I(\tau)$ decrease, and thus also $I(\tau)$ itself decreases, to a greater extent with increasing $x_\tau$ than in the cosine transition, the radiation losses are reduced as well. These lower radiation losses again require an even longer structural length for the transition. While for the cosine transition according to Equation (14) the first zero value position of the radiation characteristic occurs at $x_\tau = 3\pi/2$, in the transition having a contour according to Equation (21) it occurs only at $x_\tau = 2\pi$. The latter transition must be longer than the cosine transition in the same ratio as exists between these two $x_\tau$ values.

If this greater structural length is not highly important and if instead a reduction of radiation losses is more important, the transition must be designed according to Equation (21) and its contour has then the inclination according to Equation (22). It must then be long enough that $x_\tau = 2\pi$ lies closely above the lower limit of $\tau = 0$ of the integration range of a in Equation (4). With Equations (7) and (10) as well as with $k = 2\pi/\lambda$ the following must then apply as well:

$$l \lesssim \frac{4\lambda}{n_k - n_m} \tag{24}$$

If, however, the transition is to be as short as possible and nevertheless have low radiation losses for the fundamental mode, a contour of the type of the cosine function of Equation (14) would be preferred. In it, $x_\tau = 3\pi/2$ must lie closely above the lower limit of the integration range of $\tau$ in Equation (4). Correspondingly, Equation (24) must then be changed to $$l \lesssim \frac{3\lambda}{n_k - n_m} \tag{25}$$

The present invention can be used with any desired waveguide cross section. With circular fibers, the fiber diameter is changed accordingly. If a stripline is used as the light guide, the height and width of the rectangular cross section must be changed along the transition. With elliptical cross sections, the large and small major axes along the transition are changed continuously in such a manner that they connect the two waveguides together with a transition contour without bend.

Figure 2:
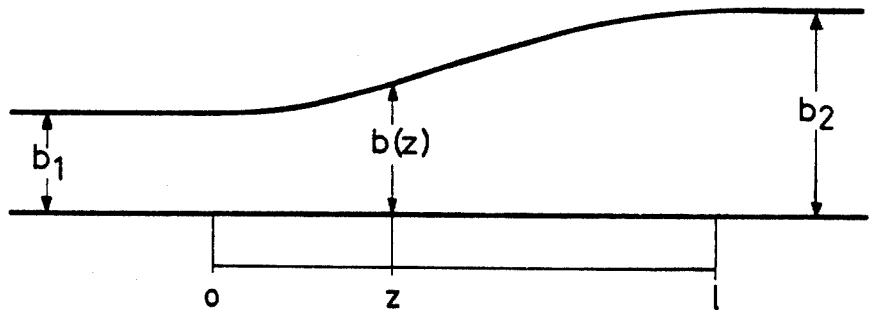

Each such structure must have a contour of the transition, as shown in FIG. 1 or FIG. 2 respectively. If the present invention is used with circular fibers, then the core diameter of the circular fiber must change along the transition, as it is shown in FIG. 1. Depending on whether the reduction of radiation loss is more important or the transition to be as short as possible, the core diameter in FIG. 1 should either follow the contour, as given by Equation (21), or the contour, as given by Equation (14). In the first case the length of the transition must be chosen according to Equation (24) and in the second case it must be chosen according to Equation (25).

If the present invention is used with planar optical strip waveguides of rectangular cross-section, then the width of the strip must change along the transition, as it is shown in FIG. 1, while the height of the strip must change along the transition, as it is shown in FIG. 2. Depending on whether the reduction of radiation loss is more important or the transition to be as short as possible, the width and the height of the strip in FIG. 1 and FIG. 2 respectively should either follow the contour, as given by Equation (21) or the contour, as given by Equation (14). In the first case the length of the transition must be chosen according to Equation (24) and in the second case it must be chosen according to Equation (25).

If the present invention is used with optical waveguides of elliptical core cross-sections then the large and small major axes of the core ellipse must change along the transition, as it is shown in FIG. 1. Depending on whether the reduction of radiation loss is more important or the transition to be as short as possible, the large and small major axes at the core ellipse in FIG. 1 should either follow the contour, as given by Equation (21) or the contour, as given by Equation (14). In the first case the length of the transition must be chosen according to Equation (24) and in the second case it must be chosen according to Equation (25).

It will be understood that the above description of the present invention is susceptible to various modifications, changes and adaptations and the same are intended to be comprehended within the meaning and range of equivalents of the appended claims.

What is claimed is:

1. A connection piece connected for propagating light between two single mode optical waveguides having respectively different cross sections, said piece being in the form of a transition from one cross section to the other, the waveguides and said piece being composed of a transparent core member forming a light propagating path from one waveguide to the other via the transition, and a cladding material surrounding the core member, the core member part of said piece being formed to vary gradually and continuously in cross section in the direction of light propagation, and said piece having a length which is two to four times the free space wavelength of the light to be propagated divided by the difference between the index of refraction of the core member and the index of refraction of the cladding material.

2. A connection piece as defined in claim 1 wherein the contour of said core member part of said piece is shaped according to a cosine function, and said piece has a length which is two to three times the free space wavelength of the light to be propagated divided by the difference between the indices of refraction of the core member and the cladding material.

3. A connection piece as defined in claim 1, wherein the contour of said core member part of said piece is shaped according to the square of a sine function, and said piece has a length which is three to four times the free space wavelength of the light to be propagated divided by the difference between the indices of refraction of the core member and the cladding material.

4. A connection piece as defined in claim 1 wherein said waveguides and connection piece are in the form of an optical stripline having a rectangular cross section, and both the height and width of said core member part of said piece change gradually and continuously in the direction of light propagation.

5. A connection piece as defined in claim 1 wherein the core member parts of said waveguides have elliptical cross sections and the cross-sectional dimensions of said core member part of said piece corresponding to the major and minor axes of said waveguide cross sections change gradually and continuously in the direction of light propagation.

* * * * *